US007010914B1

(12) United States Patent

Roberts, Jr. et al.

(10) Patent No.: US 7,010,914 B1

(45) Date of Patent: Mar. 14, 2006

(54) METHOD FOR CONTROLLING BOOST PRESSURE IN A TURBOCHARGED DIESEL ENGINE

(75) Inventors: Charles E. Roberts, Jr., Helotes, TX (US); Ryan C. Roecker, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 39 days.

(21) Appl. No.: 11/072,483

(22) Filed: Mar. 4, 2005

(51) Int. Cl.

| | |
|---|---|
| ***F02B 33/44*** | (2006.01) |
| ***F02B 37/00*** | (2006.01) |
| ***F02B 37/10*** | (2006.01) |
| ***F02D 23/00*** | (2006.01) |
| ***F02D 23/02*** | (2006.01) |

(52) U.S. Cl. .......................... 60/600; 60/611; 123/564

(58) Field of Classification Search ................. 60/600, 60/611; 123/564

See application file for complete search history.

(56) References Cited

U.S. PATENT DOCUMENTS

| | | | | |
|---|---|---|---|---|
| 5,526,645 | A | 6/1996 | Kaiser | 60/611 |
| 5,724,813 | A * | 3/1998 | Fenelon et al. | 60/611 |
| 6,276,139 | B1 * | 8/2001 | Moraal et al. | 60/611 |
| 6,295,816 | B1 | 10/2001 | Gallagher et al. | 60/611 |
| 6,457,312 | B1 * | 10/2002 | Fahringer et al. | 60/611 |
| 6,564,784 | B1 | 5/2003 | Onodera et al. | 123/698 |
| 6,701,710 | B1 | 3/2004 | Ahrens et al. | 60/611 |
| 6,722,128 | B1 * | 4/2004 | Adrian | 60/611 |
| 6,779,344 | B1 * | 8/2004 | Hartman et al. | 60/611 |
| 6,898,934 | B1 * | 5/2005 | Bayer et al. | 60/611 |
| 6,938,419 | B1 * | 9/2005 | Okuyama et al. | 60/611 |

* cited by examiner

*Primary Examiner*—Sheldon J Richter

(74) *Attorney, Agent, or Firm*—Ted D. Lee

(57) ABSTRACT

Compressor surge on turbocharged Diesel engines when operating in temporary throttled airflow, such as are required for the periodic regeneration of lean NOx traps is prevented by controlled operation of a boost air blow-off valve positioned downstream of the compressor outlet of the turbocharger.

11 Claims, 3 Drawing Sheets

METHOD FOR CONTROLLING BOOST PRESSURE IN A TURBOCHARGED DIESEL ENGINE

BACKGROUND OF THE INVENTION

1. Technical Field

This invention relates generally to a method for preventing compressor surge in a turbocharged Diesel engine and more particularly to such a method for controlling intake airflow during periods of temporary operation in a stoichiometric or richer combustion mode.

2. Background Art

The Environmental Protection Agency (EPA) has set very stringent emissions standards for heavy-duty vehicles that would reduce smog-causing emissions from trucks, buses and motor homes. The emissions standards set forth, which are to be fully implemented for model year 2010 mandate new, very stringent emission standards, as follows:

Particulate matter (PM)—0.01 g/bhp-hr

Nitrogen oxide (NOx)—0.20 g/bhp-hr

Non-methane hydrocarbons (NMHC)—0.14 g/bhp-hr.

The particulate matter emissions standard will take full effect in the 2007 heavy-duty engine model year. The NOx and NMHC standards will be phased in for Diesel engines between 2007 and 2010. The phase-in would be on a percent-of-sales basis:50% in 2007–2009, and 100% in 2010.

One of the most promising technologies for NOx treatment are NOx adsorbers, also known as "lean NOx traps." Lean NOx traps need to be regenerated periodically, for example, up to one generation cycle every 30 seconds, to restore their efficiencies. The regeneration of lean NOx traps is usually done by providing reductants, such as CO and HC under oxygen-free conditions. Historically, lean burn engines, such as Diesel engines, have used exhaust-side supplemental fuel injection systems to reduce excess oxygen upstream of the lean NOx traps. From an efficiency standpoint, the supplemental fuel is wasted because it does not contribute to engine output power.

To avoid the efficiency penalty of supplemental fuel injection, several in-cylinder, low-smoke, stoichiometric combustion technologies have been proposed by which intake airflow through the engine is substantially reduced, generally by throttling the intake airflow. However, throttling of intake airflow can produce severe engine airflow disturbances, such as compressor surge, that propagate into the engine intake and exhaust manifolds and turbo machinery. Compressor surge is an unstable operating condition in which large mass airflow oscillations occur, and not only create adversely high noise levels, but can also damage various components of the turbocharger. Most compressors have a stability limit that is defined by a minimum flow rate on a pressure-rise-versus-flow-rate characteristic curve, commonly referred to as the surge limit or surge line.

Various methods have been proposed for controlling operation of the compressor stage of a turbocharged Diesel engine. For example, U.S. Pat. No. 6,295,816 granted Oct. 2, 2001 to Gallagher, et al., titled TURBO-CHARGED ENGINE COMBUSTION CHAMBER PRESSURE PROTECTION APPARATUS AND METHOD, describes a system in which a pressure relief valve in the compressor outlet is used to control peak pressure in the combustion chambers of the engine.

U.S. Pat. No. 6,564,784 granted May 20, 2003 to Onodera, et al. for an EXHAUST GAS RECIRCULATION CONTROL APPARATUS FOR INTERNAL COMBUSTION ENGINE; U.S. Pat. No. 6,701,710 granted Mar. 9, 2004 to Ahrens, et al. for a TURBOCHARGED ENGINE WITH TURBOCHARGER COMPRESSOR RECIRCULATION VALVE; and U.S. Pat. No. 5,526,645 granted Jun. 18, 1996 to Robert M. Kaiser for a DUAL-FUEL AND SPARK IGNITED GAS INTERNAL COMBUSTION ENGINE EXCESS AIR CONTROL SYSTEM AND METHOD, all describe methods by which boost air, i.e., compressed air discharged from the compressor stage of the turbocharger, is recirculated. More specifically, Onodera, et al. controls the exhaust gas recirculation flow rate by passing compressed air from the compressor outlet directly to the turbine inlet of the turbocharger system. Compressor discharge airflow is based on the airflow pressure differential across the engine. Ahrens, et al. similarly controls the airflow pressure differential across the engine to control the exhaust gas recirculation rate by passing boost air back into the compressor inlet. Similarly, Kaiser controls the airflow pressure differential across the engine by passing boost air back into the compressor inlet stage as a means of controlling intake manifold pressure.

However, none of the above-cited references describe a method for controlling intake airflow and compressor surge during temporary periods of stoichiometric or richer combustion mode operation during which exhaust gas aftertreatment devices are regenerated. The present invention is directed to overcoming such problems. It is desirable to have a method by which turbocharger boost pressure can be controlled to avoid compressor surge, particularly during periods of reduced airflow operation in a stoichiometric or richer combustion mode for the regeneration of a lean NOx trap or other regenerable exhaust gas aftertreatment device.

SUMMARY OF THE INVENTION

In accordance with one aspect of the present invention, a method for controlling boost pressure to prevent compressor surge in a turbocharged Diesel engine during temporary operation in a stoichiometric or richer combustion mode, includes defining the surge limits of the compressor and reducing the flow of intake air during the temporary operation to provide exhaust gases that are substantially free of excess oxygen. The intake air pressure rise between the inlet and outlet of the compressor during the period of temporary operation is determined and controlled amounts of intake air discharged from the compressor outlet are passed to the ambient environment or to an exhaust gas conduit downstream of a regenerable exhaust gas treatment device. The amounts of intake air passed are controlled to lower the pressure of the intake air discharged from the compressor outlet and prevent compressor surge during the period of temporary operation in stoichiometric or richer combustion mode.

Other features of the method for controlling boost pressure to prevent compressor surge, in accordance with the present invention, include modulating an intake air throttle positioned upstream of the inlet of the compressor.

Another feature of the method for controlling boost pressure to prevent compressor surge, in accordance with the present invention, includes discharging the controlled amounts of intake air discharged from the compressor outlet through a modulatable blow-off valve positioned downstream of the compressor outlet.

Yet another method of controlling boost pressure to prevent compressor surge, in accordance with the present invention, includes reducing the flow of intake air during the period of temporary operation in a stoichiometric or richer combustion mode by modulating an intake air throttle disposed at a position downstream of the outlet of the compressor.

Yet another feature of the method for controlling boost pressure to prevent compressor surge, in accordance with the present invention, includes retaining sufficient airflow through the engine to maintain the speed of the turbine stage of a turbocharger during the temporary period of operation in a stoichiometric or richer combustion mode.

Yet another feature of the method for controlling boost pressure to prevent compressor surge, in accordance with the present invention, includes reducing the flow of intake air during a temporary period of operation in a stoichiometric or richer combustion mode by controlling the operation of an intake valve, or an exhaust valve, or both.

BRIEF DESCRIPTION OF THE DRAWINGS

A more complete understanding of the method for controlling boost pressure in a turbocharged Diesel engine, in accordance with the present invention, may be had by reference to the following detailed description when taken in conjunction with the accompanying drawings, wherein.

DETAILED DESCRIPTION OF THE INVENTION

Figure 1:
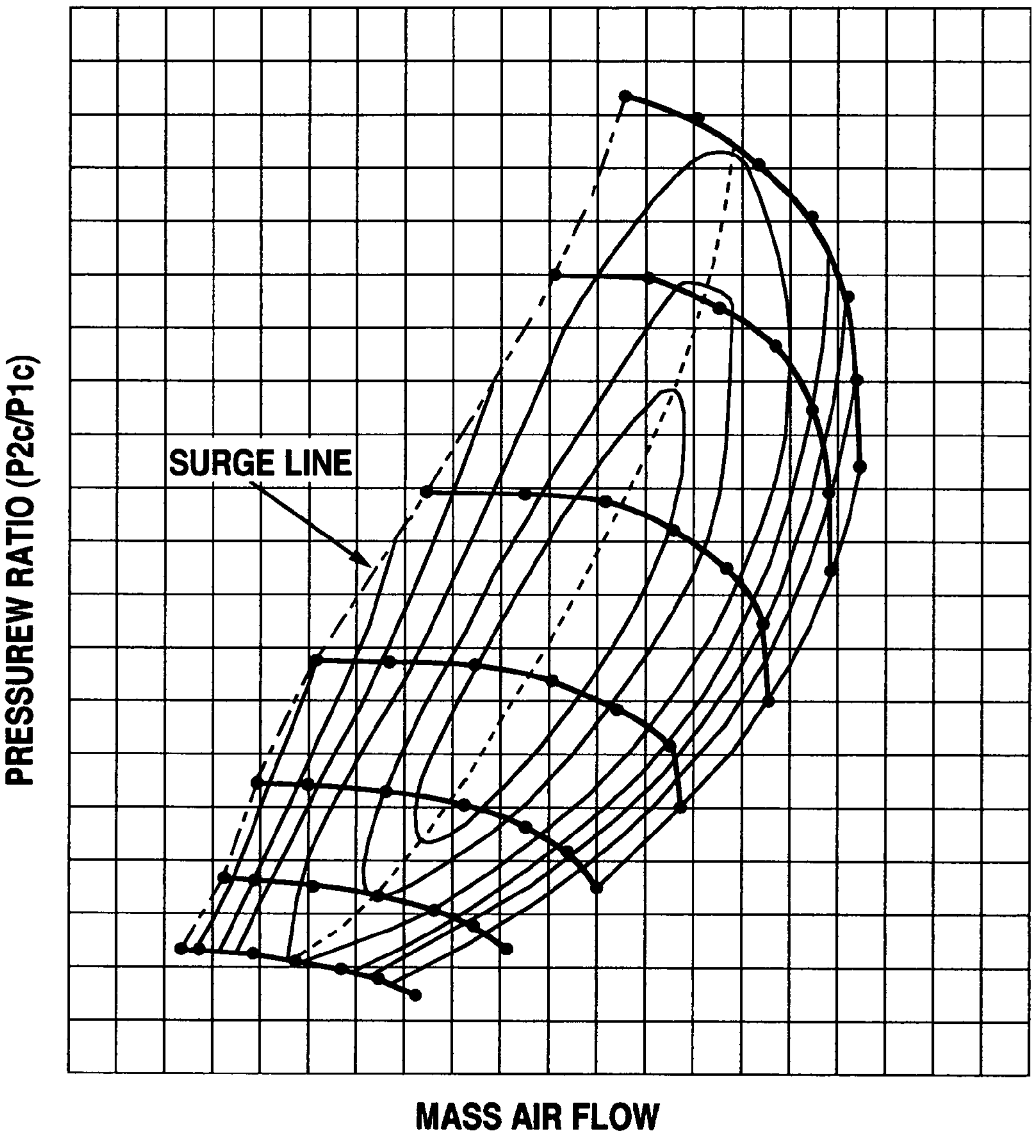
FIG. 1 is a typical compressor flow map illustrating the surge limit of the compressor.

For the purpose of describing the preferred embodiments of the present invention, a typical compressor flow map is illustrated in FIG. 1. The vertical axis of the compressor flow map represents the pressure ratio across the compressor (i.e., the outlet pressure, P2*c* divided by the inlet pressure, P1*c*). The horizontal axis of the compressor flow map is the mass air flow through the compressor. The dash line in the left-hand region of the map represents the surge limit of the compressor.

During a period of stoichiometric, or rich combustion, for example during an exhaust gas aftertreatment device regeneration event, the compressor discharge pressure P2*c* will initially increase as a result of additional fuel injected to provide the stoichiometric or richer combustion environment. Initially, the inlet pressure P1*c* will remain relatively constant, resulting in an increase in the compressor pressure ratio (P2*c*/P1*c*). Unless exhaust-side supplemental fuel injection is used to reduce oxygen in the exhaust upstream of the lean NOx trap or other regenerable aftertreatment device, the mass airflow through the compressor decreases during regeneration, which can cause the compressor to go into surge. With reference to the compressor flow map illustrated in FIG. 1, the combination of reducing mass airflow, i.e., moving left along the mass airflow axis, and the increase in pressure ratio, i.e., moving upwardly along the pressure ratio axis, can easily produce a surge condition in the compressor stage of the turbocharger. In accordance with the present invention, a modulated pressure-bleed valve is used to maintain or decrease the compressor pressure ratio to avoid surge when the intake is throttled and flow is reduced.

As a result of bleeding some of the boost air discharged from the compressor and thereby reducing air flow to the engine, as opposed to only throttling the intake airflow, any reduction in the turbocharger shaft speed will be minimized during the regeneration event. Moreover, the compressor will not be working against a closed throttle, which will allow a smoother transition from throttled operation back to normal operation and, accordingly, less time will be required to return to the before-regeneration boost levels.

Figure 2:
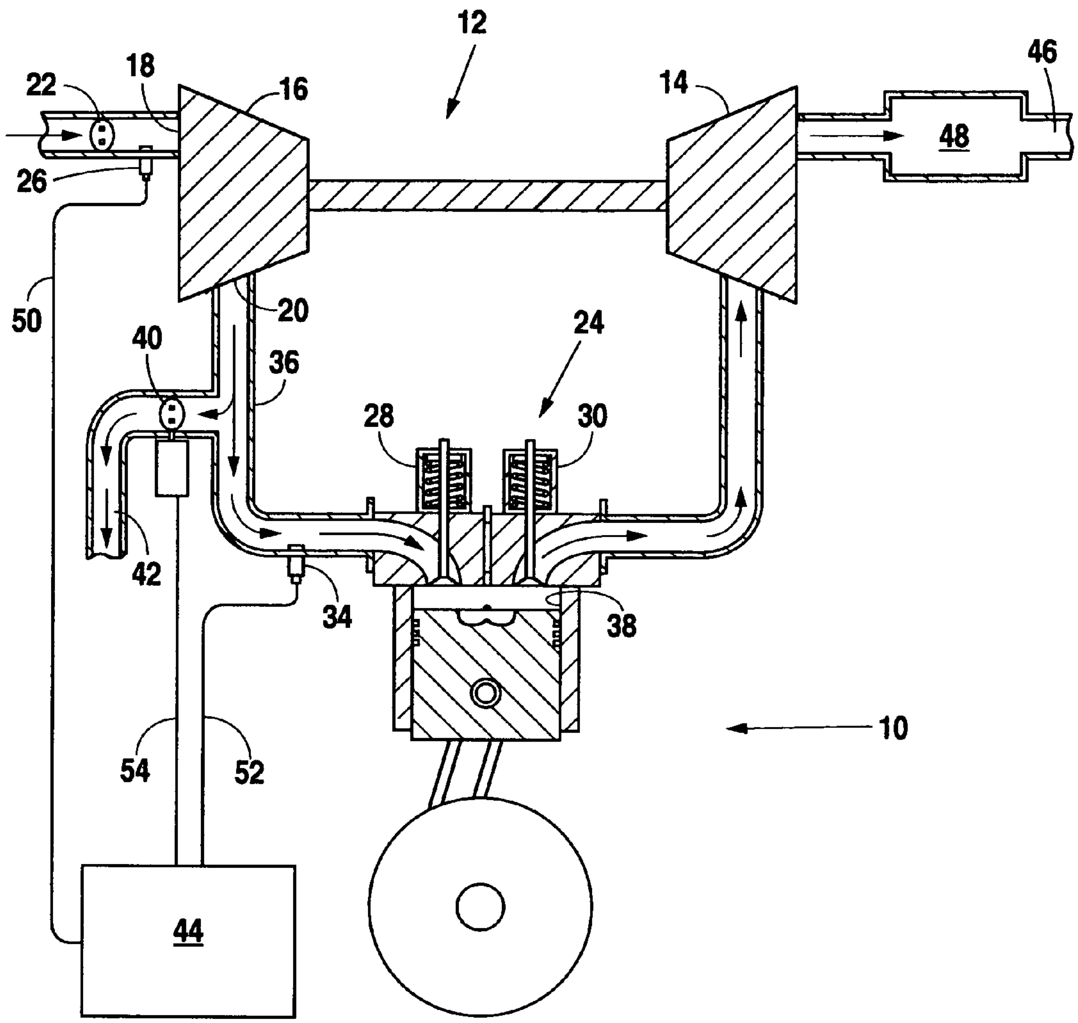
FIG. 2 is a schematic diagram of a Diesel engine assembly adapted for use in describing the method for controlling boost pressure in accordance with the present invention.

FIG. 2. illustrates a preferred first embodiment of the method, in accordance with the present invention, for controlling boost pressure to prevent compressor surge in a turbocharged Diesel engine during temporary operation in either a stoichiometric or richer combustion mode. With specific reference to FIG. 2, a conventional Diesel engine 10 has a turbocharger 12 that includes a turbine stage 14 and a compressor stage 16. The compressor stage 16 has an inlet 18 adapted to receive air from the ambient environment, and an outlet 20 through which intake air compressed by the compressor 16 is discharged. A first means for reducing intake airflow comprises an intake air throttle 22 positioned upstream of the inlet 18 of the compressor stage 16. By modulating the intake air throttle between a normally open and a closed position, the amount of ambient air available to the compressor inlet 18 is controlled. A second means for reducing intake airflow includes a variable valve actuation system 24, which controls an inlet valve 28 and an exhaust valve 30 of the engine 10. By modulating the timing, duration, and degree of open or closed positions, the amount of intake air inducted into a combustion chamber 38 of the engine 10 can be regulated by the variable valve actuation system 24. In illustrating the present invention, intake air throttling or variable valve actuation, may be used separately or concurrently in controlling intake airflow provided to the combustion chamber 38.

A pressure control valve 40 is positioned in fluid communication with a compressed air conduit 36 extending between the outlet 20 of the compressor stage and the intake valve 28 of the engine 10. The pressure control valve 40 controls airflow through a waste air conduit 42. The discharge end of the waste air conduit 42 may either be in direct communication with the ambient environment or with a portion 46 of the exhaust gas system downstream of a regenerable exhaust aftertreatment device, such as a lean NOx trap, 48. A pressure sensor 34 is positioned in the compressed air conduit 36 to sense the pressure of boost air provided to the combustion chamber 38.

In this embodiment, a compressor flow map applicable to the compressor 16 of the turbocharger 12 is downloaded to a programmable closed-loop pressure controller 44. Although not specifically shown, in the described embodiments, the compressor map is typically adjusted for ambient conditions, such as temperature and altitude.

When it is desired to temporarily reduce the flow of intake air to provide a stoichiometric or richer combustion mode for the purpose of regenerating the exhaust gas aftertreatment device 48, the intake air pressure ratio (P2*c*/P1*c*) between the inlet 18 and the outlet 20 of the compressor 16 is determined by the closed-loop pressure controller 44. The inlet pressure P1*c* may be assumed to substantially be the ambient, or barometric, pressure or sensed by the pressure sensor 26, and a signal 50 representative of the inlet pressure is provided to the programmable controller 44. The compressor outlet pressure P2*c* is sensed by the pressure sensor 34 and a signal 52 representative of the compressor outlet pressure is provided to the programmable controller 44.

After determining the intake air pressure ratio P2*c*/P1*c*, and matching that pressure ratio with the downloaded compressor flow map, the programmable controller provides a signal 54 to the pressure control valve 40 by which the pressure control valve 40 is controllably opened and controlled amounts of intake air are discharged through the waste air conduit 42. Thus, a portion of the boost air discharged from the outlet 20 of the compressor 16 is diverted from the compressed air conduit 36 and the outlet pressure P2*c* is reduced, thereby preventing compressor surge during the temporary operation in a stoichiometric or richer combustion mode.

Advantageously, by providing reduced airflow to the engine during periods of stoichiometric or rich operations by bleeding boost air instead of only throttling intake air, the present invention desirably minimizes any reduction in shaft speed of the turbocharger 12 during the regeneration event. Moreover, the compressor 16 will not be working against a closed throttle, which will allow a smoother transition from throttled operation back to normal operation and accordingly less time will be required to return to the before-regeneration boost level and engine operation.

Figure 3:
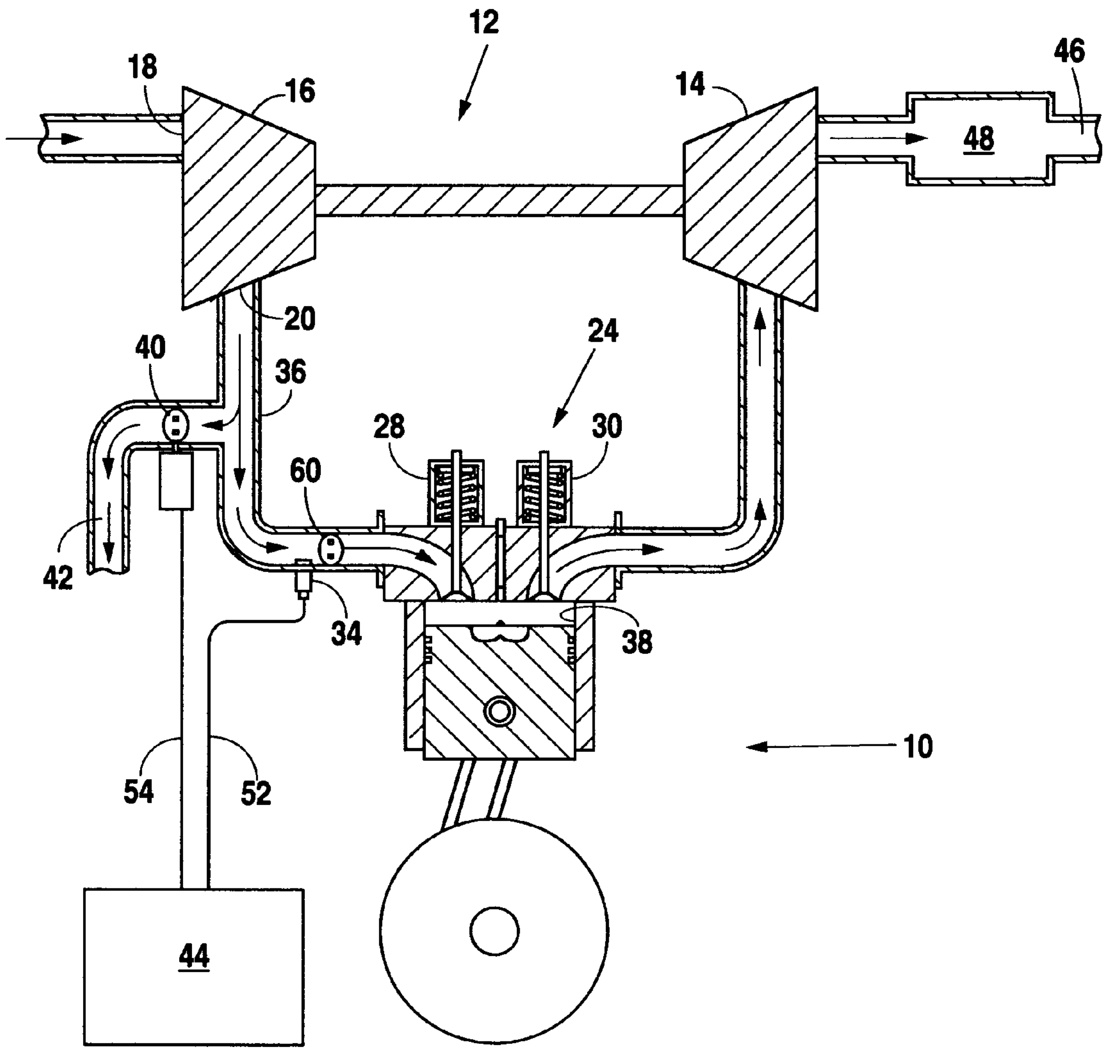
FIG. 3 is another example of an engine assembly adapted for use describing an alternate embodiment of the method for controlling boost pressure in accordance with the present invention.

In an alternative preferred embodiment illustrated in FIG. 3, an intake air throttle 60 is positioned in the compressed air conduit 36 providing communication between the outlet 20 of the compressor 16 and the intake valve 28 of the combustion chamber 38. In this embodiment, the pressure control, or blow-off, valve 40 and the boost pressure sensor 34 are positioned between the compressor outlet 20 and the intake air throttle 60.

From the foregoing descriptions of the preferred embodiments, it can be seen that the method for controlling boost pressure to prevent compressor surge provides a comprehensive, incisive means by which boost pressure can be controlled on throttled Diesel engines when temporary periods of stoichiometric or richer combustion are desired, particularly for the regeneration of lean NOx traps or other regenerable exhaust aftertreatment devices. In both embodiments, a boost blow-off valve positioned to control boost pressure downstream of the compressor is, positioned to reduce intake airflow during periods of temporary operation in a stoichiometric or rich combustion mode. Also, the method for controlling boost pressure to prevent compressor surge, in accordance with the present invention, minimizes the effect of lean NOx trap regeneration on the turbocharger system and thereby minimizes any driver perception of the regeneration event.

The present invention is described above in terms of preferred illustrative embodiments. Other aspects, features and advantages of the present invention may be obtained from a study of this disclosure and the drawings, along with the appended claims.

What we claimed is:

1. A method for controlling boost pressure to prevent compressor surge in a turbocharged Diesel engine during temporary operation in one of a stoichiometric or richer combustion mode, comprising:

defining the surge limits of a compressor of said turbocharger;

reducing the flow of intake air during said temporary operation in one of a stoichiometric or richer combustion mode to provide exhaust gases that are substantially free of excess oxygen;

determining the intake air pressure ratio between an inlet and an outlet of said compressor during said temporary operation in one of a stoichiometric or richer combustion mode;

passing controlled amounts of intake air discharged from said compressor outlet to one of an ambient environment and an exhaust gas conduit positioned downstream of a regenerable exhaust gas aftertreatment device, said controlled amounts of intake air passed to one of an ambient environment and an exhaust gas conduit being sufficient to lower the pressure of the intake air discharged from said compressor outlet and prevent compressor surge during said temporary operation in a stoichiometric or richer combustion mode.

2. The method for controlling boost pressure to prevent compressor surge in a turbocharged Diesel engine, as set forth in claim 1, wherein the turbocharger comprises a turbine mechanically coupled with said compressor, and said passing controlled amounts of intake air discharged from said compressor outlet to one of an ambient environment and an exhaust gas conduit positioned downstream of said regenerable exhaust gas aftertreatment device, includes providing intake airflow through the engine in an amount sufficient to maintain turbine speed during said temporary operation in a stoichiometric or richer combustion mode.

3. The method for controlling boost pressure to prevent compressor surge in a turbocharged Diesel engine, as set forth in claim 1, wherein the Diesel engine has a variable valve actuation system for controlling the opening and closing of intake and exhaust valves in direct communication with a combustion chamber of said engine, and said reducing the flow of intake air during said temporary operation in a stoichiometric or richer combustion mode includes controlling the operation of at least one of said intake valve and said exhaust valve of the variable valve actuation system.

4. The method for controlling boost pressure to prevent compressor surge in a turbocharged Diesel engine, as set forth in claim 1, wherein said reducing the flow of intake air during said temporary operation in a stoichiometric or richer combustion mode includes modulating an intake air throttle disposed at position downstream of the outlet of said compressor.

5. The method for controlling boost pressure to prevent compressor surge in a turbocharged Diesel engine, as set forth in claim 4, wherein said passing controlled amounts of intake air discharged from said compressor outlet includes discharging said controlled amount of intake air through a modulatable blow-off valve disposed between said outlet of the compressor and said intake air throttle.

6. The method for controlling boost pressure to prevent compressor surge in a turbocharged Diesel engine, as set forth in claim 1, wherein said reducing the flow of intake air during said temporary operation in a stoichiometric or richer combustion mode includes modulating an intake air throttle disposed upstream of the inlet of said compressor.

7. The method for controlling boost pressure to prevent compressor surge in a turbocharged Diesel engine, as set forth in claim 6, wherein said passing controlled amounts of intake air discharged from said compressor outlet to one of an ambient environment and an exhaust gas conduit positioned downstream of said regenerable exhaust gas aftertreatment device includes discharging said controlled amounts of intake air through a modulatable blow-off valve positioned downstream of said compressor outlet.

8. A method for controlling intake airflow in a turbocharged Diesel engine to regenerate an exhaust gas aftertreatment device during temporary operation in a stoichiometric or richer combustion mode, comprising:

defining the surge limits of a compressor of said turbocharger;

reducing the flow of intake air during said temporary operation in one of a stoichiometric or richer combustion mode to provide exhaust gases that are substantially free of excess oxygen;

determining an intake air pressure ratio between an inlet and an outlet of said compressor during said temporary operation in one of a stoichiometric or richer combustion mode;

passing controlled amounts of intake air discharged from said compressor outlet to one of an ambient environment and an exhaust gas conduit positioned downstream of said regenerable exhaust gas aftertreatment device, said controlled amounts of intake air passed to one of an ambient environment and an exhaust gas conduit being sufficient to decrease intake air discharged from said compressor outlet during said temporary operation in a stoichiometric or richer combustion mode.

9. The method for controlling intake airflow in a turbocharged Diesel engine, as set forth in claim 8, wherein said reducing the intake airflow during said temporary operation in a stoichiometric or richer combustion mode includes modulating an intake air throttle disposed upstream of the inlet of said compressor.

10. The method for controlling intake airflow in a turbocharged Diesel engine, as set forth in claim 8, wherein said reducing the intake airflow during said temporary operation in a stoichiometric or richer combustion mode includes modulating an intake air throttle disposed at position downstream of the outlet of said compressor.

11. The method for controlling intake airflow in a turbocharged Diesel engine, as set forth in claim 8, wherein said Diesel engine has a variable valve actuation system for controlling the opening and closing of intake and exhaust valves in direct communication with a combustion chamber of said engine, and said reducing the flow of intake air during said temporary operation in a stoichiometric or richer combustion mode includes controlling the operation of at least one of said intake valve and said exhaust valve of the variable valve actuation system.

* * * * *